Aug. 31, 1926.                                              1,598,335
                        L. ALEXANDER
            COMBINATION KITCHEN CABINET AND LIBRARY TABLE
                    Filed May 21, 1926           2 Sheets-Sheet 1

Inventor:
Lillian Alexander
By John Elias Jones
    Attorney

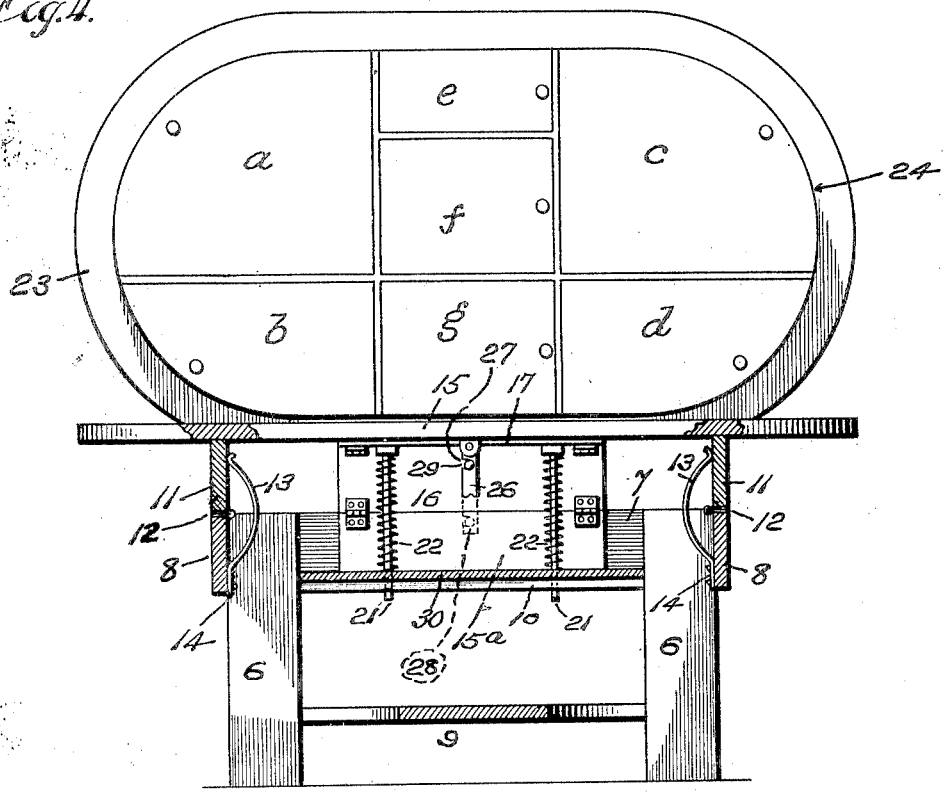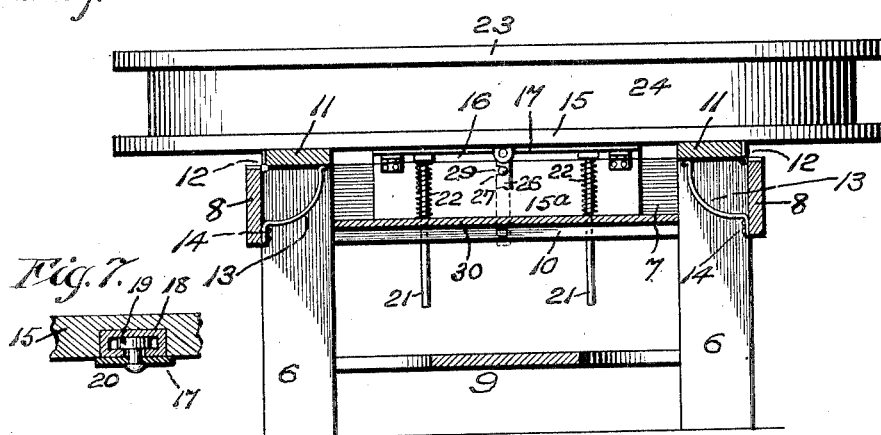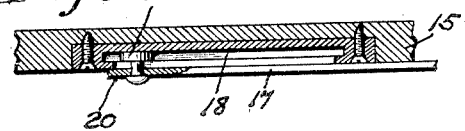

Patented Aug. 31, 1926.

1,598,335

UNITED STATES PATENT OFFICE.

LILLIAN ALEXANDER, OF CINCINNATI, OHIO.

COMBINATION KITCHEN CABINET AND LIBRARY TABLE.

Application filed May 21, 1926. Serial No. 110,808.

This invention relates to combination furniture for use on varied occasions in the kitchen or other desired apartment in the house, for both cooking and general utility purposes.

The object of the structure herein is to provide a supporting leg-foundation frame, a culinary work-board member that is flexibly connected or hinged to one longitudinal edge of said leg-foundation frame and automatically raised on its hinge-connections and held horizontal on end-folding leaves or props at the proper level for the preparation of the food on its upper face and adapted to be lowered on its said hinge-connections when the said end-folding leaves or props have been folded inwardly to a horizontal position and, finally, further provided with a combined cabinet and table-top member that is hinged along one edge to the rear edge of the said culinary work-board member whereby it may be raised into a vertical position for convenient use of the inner cabinet-face thereof or, when in its folded horizontal position or level, adapted for use as a table in dining, library and other desired general service.

The details of structure will be fully described and understood in connection with the accompanying two sheets of drawings, in which—

Figure 1:
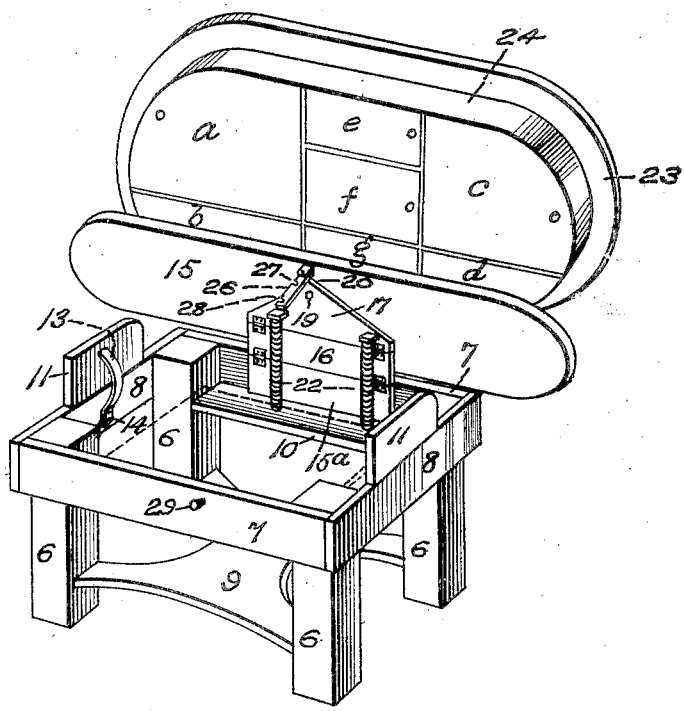
Figure 2:
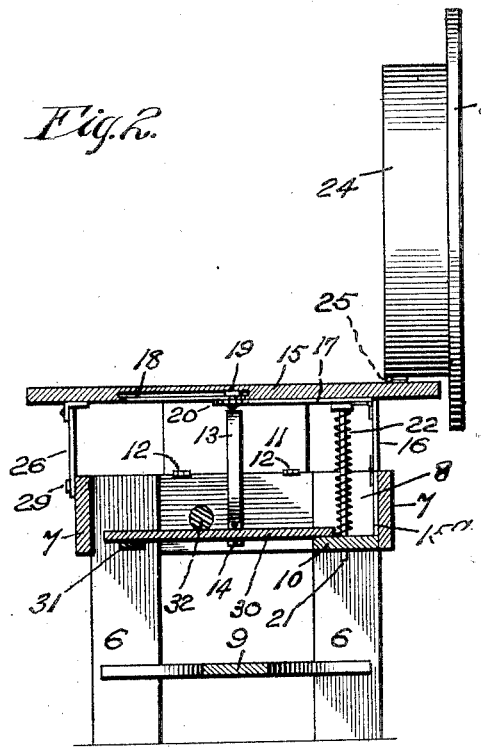
Figure 3:
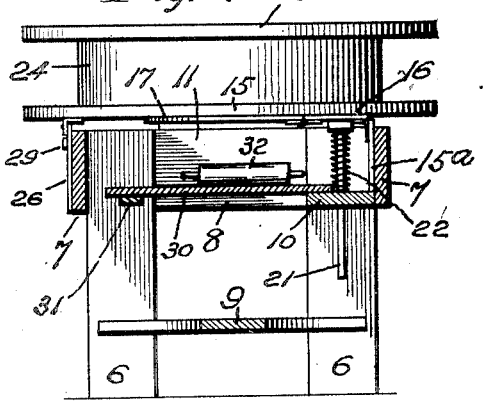

Figure 1 is a perspective view of my improvement showing both of the culinary and cabinet members thereof in raised position, in fact with the culinary work-table member raised somewhat unduly beyond its horizontal level for the purpose of more distinctly showing or divulging the various parts of the entire device that combines to make up or embody my entire invention herein; Fig. 2, a transverse section of the assembled device but with the cabinet and library-table part thereof in end elevation and raised so as to show the device in the position it assumes when used for the culinary work-table purpose mentioned; Fig. 3, a transverse section taken on the same line and plane as Fig. 2, but with the said cabinet part of the device folded or turned down into a level, horizontal position on the culinary part of the device for table use, either dining, library, or other possible desired general service; Fig. 4, a longitudinal section of the device seen in the culinary position as in Fig. 2; Fig. 5, a longitudinal section of the device seen in Fig. 3, in position for table uses, the cabinet-member being in longitudinal elevation; Fig. 6, a fragmentary transverse section of the flexibly-hinged culinary work-board, taken on line 6, 6, of Fig. 7 and showing the slotted or guideway bar for the compensating movement of the said work-table in its automatic raising to the work-level after the combined cabinet and library-table member has been raised to a perpendicular position; and Fig. 7, a fragmentary longitudinal section taken at right-angles to Fig. 6 and on line 7, 7, thereof, to show the same guideway-bar feature.

The lower supporting-member of the device is composed of four corner-legs 6, longitudinal upper-rails 7 for the legs, and end upper-rails 8 for said legs, all suitably held or united together in a secure manner, as customary in table-bases. A horizontal stretcher or lower shelf-yoke member 9 connects said legs near their lower ends in the ordinary manner. A horizontal board 10 extends between the two rear legs a short distance below their upper ends as best shown in Fig. 1, but well shown, too, in all the views, except 6 and 7, the purpose of same being referred to shortly. Boards 11, 11, hinged at 12 to the opposite end-rails 8, are adapted to be automatically-held upright by means of the spring-arms 13 that are fastened at their lower ends 14 to the inner faces of said end-rails and rest in sliding frictional-contact, at their upper ends, with the inner faces of the said boards 11. These hinged boards 11 form props that are normally-held upright by said spring-arms and thus prevented from folding inwardly except when manually done and required.

15 indicates the culinary work-board member that extends over the supporting-base in a doubly-foldable manner thus: a board 15ᵃ is attached to the inner face of the rear-rail 7 with its upper edge flush with that of the said rear-rail; a similar board 16 is hinged to said upper edge of the board 15 and then, to the upper edge of the said board 16, the elongated triangular board 17 on the bottom of the culinary work-board 15 is hinged or flexibly-connected. This manner of doubly-hinging the culinary work-board to the supporting-base enables the work-board to be folded back and raised simultaneously so that it may rest flatly in horizontal place on the upright spring-actuated and pressure-held props or side-boards 11, 11, at the opposite ends of the device, as best seen in Figs. 2 and 4, wherein the cabinet unit is arranged or set upright for its use in the culinary or food preparation service of the combination-device herein.

The inner face of the cabinet-member is provided with a number of compartments of various sizes or capacities to suit the nature of the contents supplied therein for use in the preparation of the food on the culinary work-board 15. Each of the compartments is supplied with a lid or closure-door for retaining the contents in place, whether the cabinet-member be raised or lowered, and I have designated these compartments with the letters: a, b, c, d, e, f and g, for convenience in identification.

In order that the work-board member 15 may move rearwardly and pivot on its hinges in the double-fold manner above referred to, and so that the middle board 16 can hinge to an upright position along both of its upper and lower edges, I provide a compensating device that is composed of a transverse, slotted guideway-bar 18 on the bottom of the work-board 15, flush with its lower face, as best seen in Figs. 6 and 7, and with a stud 19 projecting from the apex-part 20 of the triangular board 17 for engagement with the slot of the said guideway-bar 18, the latter feature being as best seen in Fig. 7. The said stud has free sliding-movement in the said slot and lies at the rear end of the slot when the work-board is in using-position, with the cabinet-member raised, as in Fig. 2. This compensating feature allows the work-board to rise, in its pivotally-coupled state at its rear edge, under the upward pressure of the spring-arms 13 on the end-props 11, 11, so that said end-props automatically take position under the opposite ends of the said work-board for holding it at its proper work-level for culinary-work use. The rear hinged portion of the work-board is automatically raised to the same work-level as the ends thereof by means of the pair of vertical headed-pins 21, 21, whose lower portions or shanks have a guideway in holes made in the lower cross-board 10 that lies between the two rear legs, as best seen in Fig. 1. Spiral springs 22 are provided on the pins 21 and act under their expansion between the heads of the pins and the upper face of said board 10 for the said automatic rising of the rear edge of the work-board 15 and so that the said rear edge can be duly supported on the higher work-level provided by the intermediate prop-board 16. When the work-board is to be lowered into normal, closed position on the supporting-base, with the end prop-boards 11 and the rear prop-board 16 into normal horizontal position beneath the bottom face of the work-board, the said stud 19 travels forwardly along the slotted bar 18 toward the fore edge of the said work-board, and thus there is no strain on the hinges thereof. In the lowering of the work-board it is necessary to manually force or press the spring-controlled end-props 11, 11, inwardly on their hinges 12 and to pull or draw forwardly on the work-board against the upward pressure of the spring-actuated pins 21, 21.

The cabinet-member is composed of a table-top 23 that has on its underside a set-back flange 24 of like contour, as best seen in Fig. 1, and compartments for the materials and implements used on the work-board 15 are provided within said flange, suitable lids or hinged door-members (hereinbefore designated by the letters a to g inclusive) being supplied for each compartment to close it against undue shifting or escape of its contents when the cabinet-member is in either raised or in normally closed position.

The device can be readily converted from its normal dining or library use, into culinary or kitchen-service use, by simply raising the cabinet-member to a perpendicular position on its hinges 25 (Fig. 2) and pushing it gently backward so as to give some momentum to the spring-controlled props 11, 11, and presser-pins 21, 21, together with the back-prop 16 and thereby automatically raise the work-board to its work-level, as in Fig. 2.

Without the prop devices the work-board would be too low for culinary-work use and the library-table part 23 would be too high if the legs were long enough to normally support the work-board at the proper work-level. The said prop devices thus become compensating features for the proper leveling uses of both the work-board and the library-table parts of the device, for both kitchen and living-room purposes.

A swinging catch-arm 26 is provided at the front of the work-board to hold the fore edge thereof against upward movement when either normally down or at the higher work-level, notches 27 and 28 being made in one edge for alternate-engagement with the headed pin 29 on the fore-rail 7 of the supporting base-member.

In Figs. 2 and 3, I show a bread-board 30 that is removably and conveniently held on the bar 31 and the drop cross-board 10, beneath the work-board 15, whereby ready access for use can be had, by slightly tilting the said work-board. A rolling-pin 32 is laid on the bread-board, convenient for use, and thus completing the kitchen-cabinet part of the combination structure herein.

I claim:—

1. A combination kitchen-cabinet and library-table structure comprising a supporting base-member mounted on corner legs, opposite end-rails, opposite longitudinal fore and rear side-rails, a culinary or cooking workboard having a doubly-hinged connection with the rear-rail of the base-member, automatically-actuated elevating or lifting end-props for the end-portions of the said work-board, automatically-actuated elevating or lifting rear-props for the rear-portion of the said work-board, a compensating guideway-bar and companion stud-connection between the said doubly hinged connection of the work-board and the latter whereby due allowance is made for the presence and operation of the said elevating and prop devices, a kitchen-cabinet member having lidded compartments and hinged at its rear edge to the said work-board, an outer horizontal backing for said cabinet-member that is adapted to form a library, dining or like utility table, and a latch-device at the fore edge of the work-board adapted to securely connect the latter to the fore edge of the base-member in either normally-lowered or in elevated work-spaced position, substantially as shown and described.

2. In a combined kitchen-cabinet and library-table product, the combination of a supporting base-member having corner legs, longitudinal upper fore and rear side-rails, transverse upper end-rails and a longitudinal rear drop-board between the rear legs, an upright board-member mounted on the inner face of the rear side-rail, a horizontal board-member hinged along its outer edge to the upper edge of the said last-named upright board-member and at the same level as that of the said rear side-rail, another horizontal board-member hinged at its outer edge to the fore edge of the last-named board-member and with its fore edge provided with a median vertical stud-member, a culinary work-board member having on its under side a transverse centrally-crossed guideway-bar in which the said stud-member is engaged for forward and rearward movements, horizontal, transverse, end prop-boards hinged at their outer edges to the upper edges of the end-rails of the supporting base-member, spring-arms on the inner faces of the said end-rails adapted to engage the lower faces of the said end prop-boards for automatically raising them on their hinges into vertical or upright position when the work-board is to be set or elevated into a higher level or position for active work use, vertical presser spring-pins whose shanks engage holes in the rear drop-board and whose heads engage under upward-expansive pressure the under side of the normally-horizontal doubly-hinged rear prop-board between the said upright rear-board and the compensatory slidable triangular board on the bottom of the work-board, a normally-horizontal kitchen-cabinet member hinged at its rear edge to the rear edge of the work-board and having lidded compartments, a top-backing for the said cabinet-member adapted to also form a library, dining or other like utility table-member when the cabinet-member is in its said normally-horizontal closed position, and a fastening clasp or latch device at the fore part of the work-board adapted for adjustable engagement with the said base-member, substantially as shown and described.

In testimony whereof I hereunto affix my signature.

LILLIAN ALEXANDER.